H. T. BATTIN.
LOCK NUT.
APPLICATION FILED FEB. 2, 1911.
1,020,178.
Patented Mar. 12, 1912.
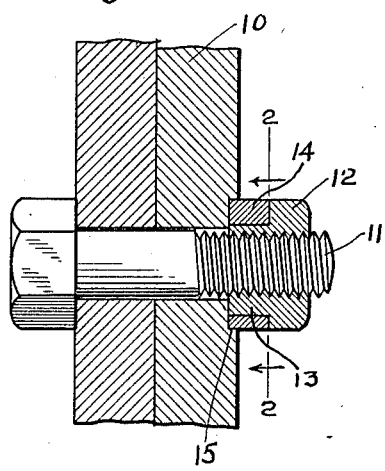
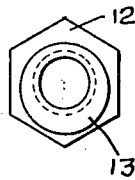
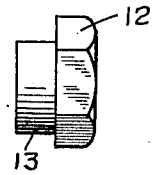
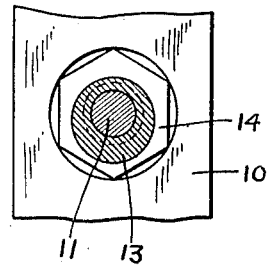
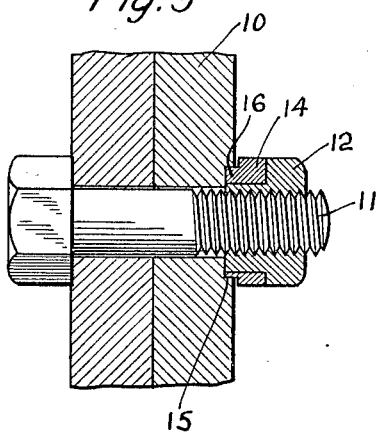
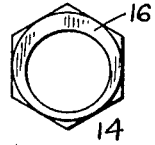
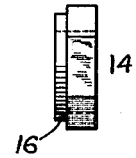
WITNESSES:
H. W. Meade
S. W. Atherton.
INVENTOR
Harold T. Battin
BY
A. M. Wooster
ATTORNEY

UNITED STATES PATENT OFFICE.

HAROLD T. BATTIN, OF BRIDGEPORT, CONNECTICUT.

LOCK-NUT.

1,020,178.  Specification of Letters Patent.  Patented Mar. 12, 1912.

Application filed February 2, 1911. Serial No. 606,245.

*To all whom it may concern:*

Be it known that I, HAROLD T. BATTIN, a citizen of the United States, residing at Bridgeport, county of Fairfield, State of Connecticut, have invented an Improvement in Lock-Nuts, of which the following is a specification.

This invention has for its object to provide a simple and inexpensive lock nut adapted for general use as upon machinery, locomotives, cars, automobiles, etc., which by a slight additional operation after the nut has been turned to place will effectually lock the nut so that it cannot jar loose or the bolt cannot be turned out until after a simple and quickly performed unlocking operation has been performed.

With the above and other objects in view I have devised the novel lock nut of which the following description in connection with the accompanying drawing is a specification, reference characters being used to indicate the several parts.

Figure 1 is a sectional view illustrating the construction and operation of my novel lock nut; Fig. 2 a section on the line 2—2 in Fig. 1, looking in the direction of the arrows; Figs. 3 and 4 elevations of the nut from different points of view; Fig. 5 a view corresponding with Fig. 1, illustrating a slightly variant form of the invention; and Figs. 6 and 7 are elevations from different points of view of the locking collar detached, corresponding with Fig. 5.

10 denotes work or pieces of material secured together by a bolt 11 to which my novel lock nut is applied. The nut as a whole comprises a head indicated by 12 which may be of any ordinary or preferred outline or configuration, under the head an eccentric 13 and a locking collar 14 having an eccentric hole in which the eccentric is adapted to oscillate. The inner end of the locking collar engages a circular recess 15 in the work which is concentric with the bolt hole. The hole through the head and the eccentric is of course concentric with the bolt. The exact size or configuration of the eccentric is immaterial, the requirements being simply a short radius and a long radius opposite thereto.

I have illustrated the head of the nut as hexagonal, although any other form of polygonal nut may be used if preferred. The external configuration of the locking collar is likewise made polygonal to correspond with the head of the nut. In the form illustrated in Figs. 1 and 2, the inner ends of the angles of the locking collar closely engage the wall of recess 15 in the work, as clearly shown in Fig. 2.

The form illustrated in Figs. 5 to 7, inclusive, differs only in that the eccentric hole in the collar is surrounded by an eccentric flange 16. The recess 15 in the work is in this form made of slightly less diameter than the polygonal portion of the locking collar and is closely engaged by the eccentric flange.

The operation is as follows: In turning on the nut the angular faces of the head and of the locking collar are both engaged by a wrench and set up tight, the locking collar turning freely in the countersunk recess so long as the angular faces of the head and the locking collar are retained in alinement. Having set the nut up tight by turning the head and the locking collar together, the wrench is then applied to the locking collar alone and said collar is given movement independently of the head, the effect of which is to cause the wall of the eccentric hole in the collar to engage the eccentric and to force one side of the periphery of the locking collar, or of eccentric flange 16 if a flange is provided on the collar, into binding engagement with the wall of recess 15 in the work, thus effectually locking the collar to the eccentric on the nut and also effectually locking the nut and the collar against rotation through the engagement of the side of the locking collar or of the eccentric flange if used with the wall of the recess in the work. This engagement is so strong that it is practically impossible to turn off the nut by power applied to the head and it also effectually prevents the nut from jarring loose, as when used upon the fish plates of a rail joint or on locomotives, passenger and freight cars, automobiles, etc. To remove the nut it is simply necessary to apply the wrench first to the collar and turn it sufficiently to place the angular sides in alinement with the angular sides of the head, after which the nut as a whole may be turned off readily by applying the wrench to both the head and the locking collar.

Having thus described my invention I claim:

The combination with a member provided with a recess, of a nut having an angular head and an eccentric sleeve formed under said head, said sleeve and head being internally threaded to receive the threaded end of a bolt, and a locking collar having its outer surface flush with said head and adapted to fit in the recess in said member, said collar having an eccentric hole extending entirely therethrough, through which said sleeve passes whereby said collar may be forced against the wall of said recess to lock the nut.

In testimony whereof I affix my signature in presence of two witnesses.

HAROLD T. BATTIN.

Witnesses:
A. M. WOOSTER,
S. W. ATHERTON.